Patented Feb. 17, 1931

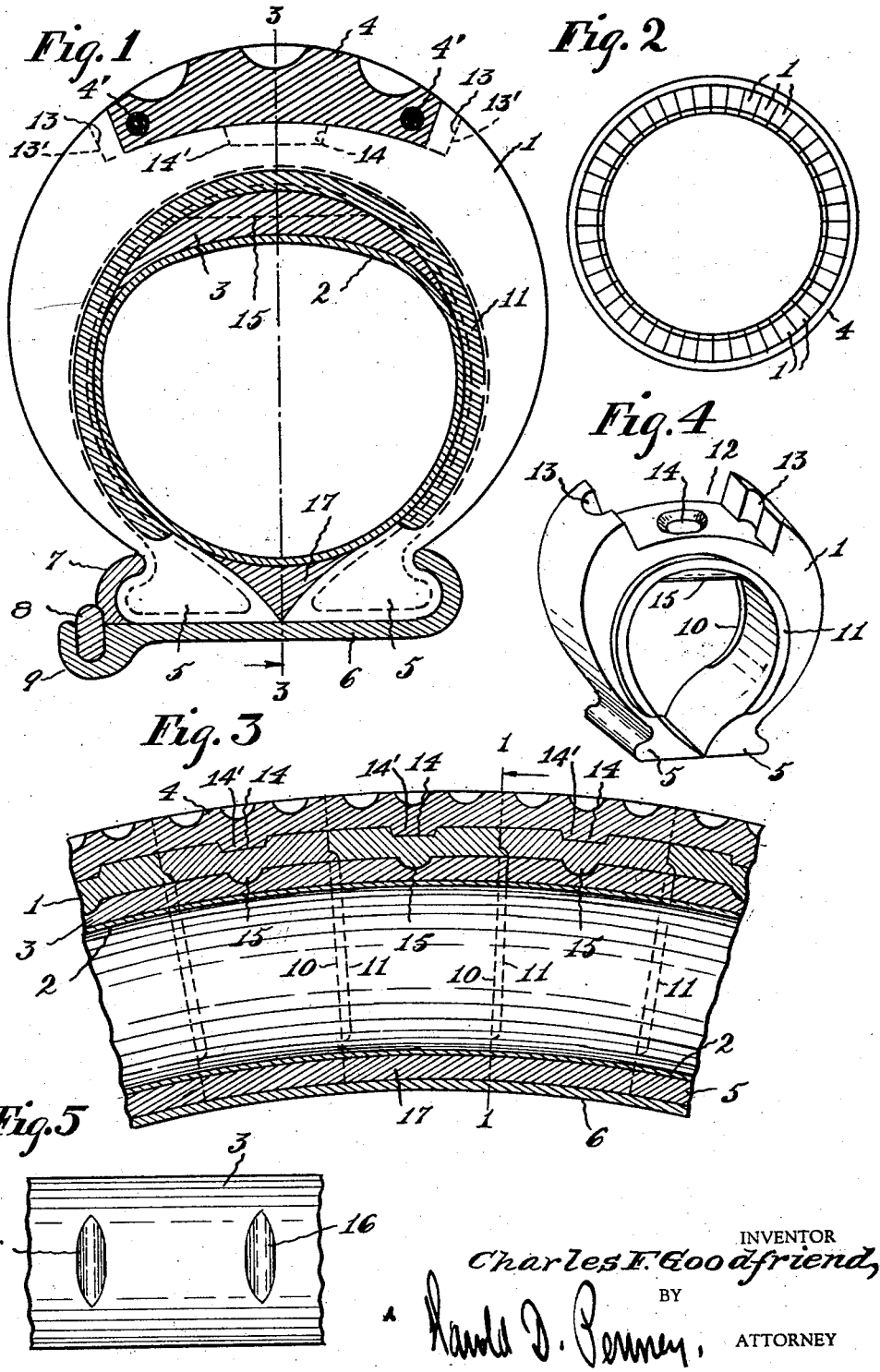

1,792,901

UNITED STATES PATENT OFFICE

CHARLES F. GOODFRIEND, OF JERSEY CITY, NEW JERSEY

PNEUMATIC VEHICLE SHOE

Application filed October 1, 1927. Serial No. 223,346.

My present invention relates to an improvement in pneumatic tires for vehicles and has for its main object the development of a shoe which is built up of sections, thereby to provide for renewal of damaged sections of the shoe by replacement, in the event of local damage of such sections through accident.

Another object of my invention is to provide means thereon whereby, in a sectional tire of the type about to be described, a renewable tread portion is provided, to absorb all of the traction wear so that, when necessary, new sections of the tire may be inserted, as required, without detriment to the continued use of the tire, and without preventing re-use of the traction strip thereon until it is worn beyond further service.

Another advantage of my construction is in the provision of means whereby in said sectional tire, the cooperating sections utilized in forming a complete shoe are interlocked, one with the other, both by means provided upon the associate sections themselves and by the cooperating additional means therein, such as an interliner which coordinates with the assembled sections of the shoe to interiorly interlock them together as a unit.

Another advantage of my device is the provision of means upon the traction or road wearing strip of the tire whereby it is also interlocked with the sectional structures forming the shoe portion, thereby to further combine them together into a unitary structure and to prevent creeping of such tread section.

These and other capabilities will be ascertained as the herein description proceeds and it is obvious that modications may be made in the various features of my device without departing from the spirit of the herein invention and without contravening the scope of the appended claims.

In the drawings:

Fig. 1 is a transverse view of one of the sectors of my improved tire showing the tread portion and the liner and inner tube portions in section, the said tire being shown as mounted upon the usual type of demountable rim, which is also in section.

Fig. 2 is a reduced assembled view of my device showing the tire as it appears properly assembled.

Fig. 3 is a longitudinal sectional view of my tire taken on the line 3—3, Fig. 1, looking in the direction of the arrow.

Fig. 4 is a perspective view of one sectional unit of my shoe construction showing the component parts thereof.

Fig. 5 is a top view of the inner interlocking interliner showing the key portions therein whereby the unit tire sectors are bound together.

In my present construction my tire comprises a series of similar radially developed sections or units 1, Fig. 2, each of the units being separate one from the other, but being of like construction and of such suitable unitary dimensions that when assembled they will make a complete assembled shoe and, allowing for use therewith, of a replaceable and renewable tread portion 4 and the interior use of an inner pneumatic tube to be filled with air under pressure, in the present day custom.

To this end the unit sectors 1, as indicated in the various views and more especially in Fig. 1, are made up of either fabric or cord inner cores, not shown, it being understood that these cores are made in any suitable manner as is customary at the present time for the usual type of pneumatic shoe construction, and having the same general external contour in cross-sectional area as any standard type of known shoe, with the exception that each section 1 is of fabric or cord reinforced, which is molded into and protected by a surrounding outer rubber body portion, after the manner in the construction of tires. Such outer molded rubber portion protects the fabric reinforcing cores against deterioration.

The bead 5 of the said tire may be strengthened against being pulled from the rim by the inclusion therein of any suitable means in the form of a compacted fabric filler, not shown, which is also molded within the outer rubber contour of the shoe forming unit and which bead acts as an anchorage for the tire section when engaged by the rim 6—7 in operative position.

At the upper end of said unit 1, and as disclosed in Figs. 1 and 4, there is provided a channel 12 which is provided with an indent 14 at its intermediate tread section and with similar intermediate side indents 13 provided at the opposite side walls thereof, said indents 13 and 14, and the channel, forming interlocking keyways for the reception therein of a renewable rubber tread forming section 4, Figs. 1, 2 and 3.

Said tread forming section 4 may be of circular endless construction, is made of suitable rubber stock to resist wear and is provided near its outer sides, as in Fig. 1, with circular and endless reinforcing wires or cables 4', as shown in the sectional view of said tread in Fig. 1. Said tread stock is also provided with projections, such as lugs 13' and keys 14' at its sides and bottom to cooperate and engage into the indents 13 and 14 of each individual sector unit of the assembled tire, thereby to aid in holding said tire units as a unitary whole and simultaneously to prevent creeping of the tread section 4, under the traction forces encountered in use, when in operative position upon the rim.

The inner or tube chamber portions of these tire sectors 1 are provided with a transversely located, integrally molded rubber projection 15 which is located about midway of each shoe forming sector 1 in such a manner as to reinforce the section to which it is associated. An interliner 3 of suitable associate contour and being endless and made up of molded fabric and rubber, is located within the upper portion of the said shoe sectors 1; the said interliner 3 is provided with indents 16, Fig. 5, in its outer circumferential surface whereby to mesh and engage with said transverse keys 15 thereby to further reinforce the said units and to aid in the integralizing of the assembled units as a whole. This latter construction is fully shown in the transverse sectional view, Fig. 1, and also in the longitudinal sectional view, Fig. 3.

The shoe forming sectors 1 are further provided with a series of mutual-interlocking projections 11, Figs. 3 and 4, these being, in their preferred embodiment, in the form of a substantially circular outstanding extension 11 carried on one side of each of said sectors 1, near the inner wall thereof, and on the opposite side thereof each sector 1 being provided with a projection receiving recess 10 which receives therein the associated projection 11 of the adjacent tire forming sector 1. To this extent the sectors 1 are provided with a series of interlocking joints therebetween, said joints substantially surrounding the inner, air tube receiving portions of said sectors 1.

Into all of the foregoing is introduced, in the usual manner, the customary inner air tube 2, Figs. 1 and 3, and if found desirable, a separate non-resilient tire flap 17, of a substantially arcuate outwardly concave transverse outline on the outer periphery thereof, as shown in Fig. 1, may be utilized to fill in the space between the beads 5, to hold the beads to the rim and to keep the inner part of the air tube 2 substantially circular in cross-section.

When the tire is mounted upon the customary type of rim 6 and, after assembly, is locked therein, by means of the usual removable rim 7, and rim lock 8, in accordance with the usual construction of such demountable rims, and air pressure is applied to the interior of the inner tube 2, the tendency of the pressure is to unify all of the separate shoe forming sectors 1 and to greatly reinforce the outer or traction side of the shoe and due to the interlocking joints formed by the extensions 11 with the adjacent associated recesses 10, the tire in its complete assembly is held rigidly in position without any tendency to creep or blow off the rim.

In use should any single sector or unit 1 become injured or destroyed, or any group of associated sectors 1, it is obvious that the air tube 2 may be deflated and removed, the tread portion 4 removed therefrom and new sectors 1 assembled into the shoe to replace those damaged, whereupon the tread portion 4 may be remounted and the air tube again inflated.

It might be here noted that I make no claim as to the exact method whereby the sectors 1 may be interiorly reinforced by either cord or fabric construction nor the manner in which the beads 5 may be made to withstand the strains in use, it being understood that such form of interior fabric or cord carcass is utilized in a manner suitable for the purpose of carrying out my present idea of a sectionally built up pneumatic tire shoe.

Having thus described my invention, what I claim is:

1. In a pneumatic tire shoe of the class described a plurality of removable shoe sections, a means for preventing centrifugal disruption of said sections, an indented interliner, positioned interiorly of said shoe sections, and projections on said sections, to engage the indentations on said interliner, thereby interlocking said sections with said interliner.

2. In a pneumatic tire shoe of the class described a plurality of contiguous removable shoe sections, each having thereon a transverse channel, a tread, encompassing said sections, positioned in said channel, and a means for interlocking said tread with each of said sections, to prevent relative sliding motion therebetween.

3. In a pneumatic tire shoe of the class described a plurality of contiguous removable shoe sections, each having thereon a transverse channel, including an indent, the channel walls having therein opposed side indents, and a tread, encompassing said sections, positioned in said channel, said tread embodying projections, interlocking with said channel indents, and side lugs, interlocking with said channel wall indents, thereby preventing relative sliding motion therebetween.

4. In a pneumatic tire shoe of the class described a plurality of removable shoe sections, contacting with each other at their ends, an endless tread member, encompassing the outer sides of said sections, an endless interliner, which is solid in cross-section, positioned in the interior of said sections, interlocking means on the inner sides of said sections and corresponding interlocking means on the outer periphery of said interliner, disposed to register with said first mentioned interlocking means.

5. In a pneumatic tire shoe of the class described a plurality of contiguous removable shoe sections, having each thereon on the outer periphery thereof a transverse channel and a radially disposed central indent in each of said sections, extending inwardly from the bottom of each of said channels, and an endless resilient tread, encompassing said sections, positioned in said channels in contact with the bottoms thereof, said tread embodying therein on the inner periphery thereof inwardly extending projections to fit said indents, interlocking with said indents, thereby opposing relative peripheral sliding motion between said sections and said tread and permitting relative radial motion between the parts thereof.

6. In a penumatic tire shoe of the class described a plurality of contiguous removable sections, each having thereon a transverse channel, the walls of said channels having therein opposed substantially radially disposed side indents, extending through substantially the full depth of said channels, a resilient tread, encompassing said sections, positioned in said channel, said tread embodying therein substantially radially disposed side lugs, to fit said indents, interlocking with said channel wall indents, thereby opposing relative peripheral sliding motion between said sections and said tread and permitting relative radial motion between the parts thereof.

Signed at New York, in the county of New York and State of New York, this 30th day of September, A. D. 1927.

CHARLES F. GOODFRIEND.